US012811028B2

(12) United States Patent
Deighton

(10) Patent No.: US 12,811,028 B2
(45) Date of Patent: Nov. 24, 2026

(54) SUBMARINE CABLE COMPRISING AT LEAST ONE ALUMINIUM TENSILE REINFORCEMENT STRAND, RELATED UMBILICAL, INSTALLATION AND METHOD

(71) Applicant: TechnipFMC Subsea France, Courbevoie (FR)

(72) Inventor: Alan Deighton, Sunderland (GB)

(73) Assignee: TechnipFMC Subsea France (FR)

( * ) Notice: Subject to any disclaimer, the term of this patent is extended or adjusted under 35 U.S.C. 154(b) by 227 days.

(21) Appl. No.: 18/249,172

(22) PCT Filed: Oct. 14, 2021

(86) PCT No.: PCT/EP2021/078478
§ 371 (c)(1),
(2) Date: Apr. 14, 2023

(87) PCT Pub. No.: WO2022/079183
PCT Pub. Date: Apr. 21, 2022

(65) Prior Publication Data

US 2023/0395283 A1 Dec. 7, 2023

(30) Foreign Application Priority Data

Oct. 15, 2020 (EP) .................................... 20306210

(51) Int. Cl.
*H01B 7/28* (2006.01)
*G02B 6/44* (2006.01)
(Continued)

(52) U.S. Cl.
CPC ......... *H01B 7/2825* (2013.01); *G02B 6/4416* (2013.01); *G02B 6/443* (2013.01);
(Continued)

(58) Field of Classification Search
CPC . H01B 7/02; H01B 7/04; H01B 7/041; H01B 7/046; H01B 7/14; H01B 7/18;
(Continued)

(56) References Cited

U.S. PATENT DOCUMENTS 1,671,611 A 5/1928 Rossman
4,239,336 A * 12/1980 Parfree ................ G02B 6/4416 385/101
(Continued)

FOREIGN PATENT DOCUMENTS

CN 102376392 A 3/2012
CN 209103848 U 7/2019
(Continued)

OTHER PUBLICATIONS

IEC 60840 "International Standard", The International Electrotechnical Commission (IEC), 4th Edition, ISBN: 978-2-88912-752-8. 2011. (English translation attached).
(Continued)

*Primary Examiner* — William H. Mayo, III
(74) *Attorney, Agent, or Firm* — OSTROLENK FABER LLP

(57) ABSTRACT

A submarine cable that includes an external tubular sheath defining an inner space and insulating the inner space from the outside of the submarine cable. An internal metallic tube placed in the inner space and receiving at least one optical fiber therein. An electrical insulation arrangement placed in the inner space externally around and apart from the internal metallic tube. At least a tensile reinforcement layer formed of conductive tensile reinforcement strands made of aluminum or of an aluminum alloy and placed between the electrical insulation arrangement and the internal metallic tube.

13 Claims, 5 Drawing Sheets

(51) Int. Cl.

| | |
|---|---|
| ***H01B 7/14*** | (2006.01) |
| ***H01B 7/282*** | (2006.01) |
| ***H01B 9/00*** | (2006.01) |
| ***H01B 9/02*** | (2006.01) |

(52) U.S. Cl.
CPC ............... *H01B 7/14* (2013.01); *H01B 9/005* (2013.01); *H01B 9/02* (2013.01)

(58) Field of Classification Search
CPC ........ H01B 7/182; H01B 7/1825; H01B 7/28; H01B 7/2806; H01B 7/29; H01B 9/005; H01B 9/02; H01B 11/02; H01B 11/22; H01B 12/02; H01B 13/0036; H01B 13/06; H01B 13/22; H01B 13/0023; G02B 5/16; G02B 6/44; G02B 6/4402; G02B 6/4413; G02B 6/4427; G02B 6/4486; G02B 6/50; G02B 6/506; G01R 15/20; G01R 31/58
USPC ....... 174/102 R–116; 166/65.1; 385/109–113
See application file for complete search history.

(56) References Cited

U.S. PATENT DOCUMENTS

| | | | | | |
|---|---|---|---|---|---|
| 4,371,234 | A * | 2/1983 | Parfree | G02B 6/4427 385/103 |
| 4,490,009 | A | 12/1984 | Nakai et al. | |
| 4,606,604 | A * | 8/1986 | Soodak | G02B 6/4416 385/101 |
| 4,671,611 | A * | 6/1987 | Allemand | G02B 6/4489 385/105 |
| 4,979,795 | A * | 12/1990 | Mascarenhas | H01B 7/14 385/107 |
| 5,218,658 | A * | 6/1993 | Macleod | G02B 6/4416 385/103 |
| 5,787,217 | A | 7/1998 | Traut et al. | |
| 5,892,874 | A * | 4/1999 | Houghton | G02B 6/4416 385/101 |
| 6,538,198 | B1 | 3/2003 | Wooters | 174/47 |
| 8,957,312 | B2 * | 2/2015 | McCullough | H01B 13/00 174/126.4 |
| 9,074,445 | B2 | 7/2015 | Burdick | |
| 10,529,468 | B2 * | 1/2020 | Goodman | G02B 6/4413 |
| 11,531,175 | B2 * | 12/2022 | Mendez | G02B 6/506 |
| 2002/0027012 | A1 * | 3/2002 | Bonicel | H01B 7/22 174/102 R |
| 2003/0169179 | A1 * | 9/2003 | James, II | G02B 6/4433 340/854.9 |
| 2004/0165853 | A1 * | 8/2004 | Matsueda | G02B 6/4428 385/136 |
| 2009/0120632 | A1 * | 5/2009 | Worman | H01B 7/045 166/65.1 |
| 2018/0350488 | A1 * | 12/2018 | Varkey | H01B 13/26 |
| 2018/0374613 | A1 * | 12/2018 | Zymelka | H01B 1/026 |
| 2019/0057794 | A1 * | 2/2019 | Jung | H01B 7/0208 |
| 2019/0228876 | A1 * | 7/2019 | Consonni | G02B 6/4432 |
| 2021/0116516 | A1 * | 4/2021 | Maioli | G01R 31/58 |
| 2021/0391098 | A1 * | 12/2021 | Johanson | H01B 9/02 |
| 2022/0139595 | A1 * | 5/2022 | Tyrberg | G02B 6/4427 385/13 |

FOREIGN PATENT DOCUMENTS

| | | | | |
|---|---|---|---|---|
| DE | 3706740 | A1 * | 9/1988 | G02B 6/4416 |
| GB | 2101505 | A | 1/1983 | |
| GB | 2165961 | A | 4/1986 | |
| JP | S 55121408 | A | 9/1980 | |
| JP | S 57176003 | A | 10/1982 | |
| NO | 343113 | B1 | 11/2018 | |
| SE | 2051130 | A1 | 9/2020 | |
| WO | WO 2010010396 | | 1/2010 | |
| WO | WO-2010010396 | A1 * | 1/2010 | H01B 7/14 |
| WO | WO 201166530 | A9 | 6/2011 | |
| WO | WO 201210191 | A1 | 1/2012 | |

OTHER PUBLICATIONS

International Search Report mailed Jan. 24, 2022 in corresponding PCT International Application No. PCT/EP2021/078478.
API 17E / ISO 13628-5 "Specification for Subsea Umbilicals", the American Petroleum Institute (API), 4th Edition, Oct. 2010.
"OPGW. OPPC and Accessories—Customer Focused Solutions", nkt Cables.

* cited by examiner

SUBMARINE CABLE COMPRISING AT LEAST ONE ALUMINIUM TENSILE REINFORCEMENT STRAND, RELATED UMBILICAL, INSTALLATION AND METHOD

CROSS-REFERENCE TO RELATED APPLICATIONS

The present application is a 35 U.S.C. §§ 371 national stage application of International Application No. PCT/EP2021/078478, filed Oct. 14, 2021, which claims priority to European Patent Application No. 20306210.4, filed Oct. 15, 2020, the contents of which are incorporated herein by reference.

BACKGROUND OF THE INVENTION

The present invention relates to a submarine cable, comprising:

- an external tubular sheath defining an inner space, the external tubular sheath insulating the inner space from the outside of the submarine cable,
- at least one optical fiber.

The invention also relates to a subsea umbilical for use in the offshore oil and gas industry, said subsea umbilical comprising such a submarine cable.

A subsea umbilical consists of a group of one or more types of elongated active umbilical elements, such as electrical cables, optical fiber cables, steel pipes and/or hoses, cabled together for flexibility, over-sheathed and, when applicable, armoured for mechanical strength. Umbilicals are typically used for transmitting power, signals and fluids (for example for fluid injection, hydraulic power, gas release, etc.) to and from a subsea facility.

The normative document API 17E/ISO 13628-5 "Specification for Subsea Umbilicals published by the American Petroleum Institute (API), 5$^{th}$ Edition, July 2017 provides standards for the design and manufacture of such umbilicals.

U.S. Pat. No. 9,074,445 discloses an umbilical comprising an external tubular sheath enclosing an insulated power line and a separate control line.

An umbilical such as described above is not satisfactory. In the harsh operational subsea environment, it is always desirable to increase the structural strength of submarine cables. Steel tensile armour strands are often provided in order to enforce the structure of submarine cables. Steel strands are however heavy and increase the weight of submarine cables.

Moreover, as submarine cables are commonly used to transmit electrical energy from a surface facility to a subsea facility, it is preferable to improve the conductivity of these submarine cables.

Additionally, such a submarine cable is bulky and expensive to manufacture.

An objective of the present invention is to obtain a submarine cable which provides efficient power transmission in a long tie back with high structural strength, as well as excellent electrical conductivity, and which has nevertheless reduced bulkiness and cost.

SUMMARY OF THE INVENTION

To that aim, the present invention discloses a submarine cable as described above, wherein the submarine cable further comprises:

- an internal metallic tube placed in the inner space, the at least one optical fiber being placed in the internal tube,

- an electrical insulation arrangement placed in the inner space, externally around and apart from the internal metallic tube,
- at least a tensile reinforcement layer formed of conductive tensile reinforcement strands made of aluminium or of aluminium alloy placed between the electrical insulation arrangement and the internal metallic tube.

The submarine cable according to the invention may comprise any or several of the following features, taken individually or according to any technically possible combination:

- the conductive tensile reinforcement strands have an electrical conductivity higher than 40% IACS and a maximum theoretical water depth Dm larger than 4000 m,
- the conductive tensile reinforcement strands placed between the electrical insulation arrangement and the internal metallic tube only comprises metals having an electrical conductivity comprised between $2.0\times10^7$ S/m and $4.6\times10^7$ S/m at 20° C.,
- the electrical insulation arrangement comprises an inner semi-conductive sheath, an intermediate electrically insulating sheath and an outer semi-conductive sheath,
- it comprises between the external tubular sheath and the electrical insulation arrangement, an electromagnetic shield outer screen,
- at least one tensile reinforcement layer has a first end electrically connected to a current source, in particular a direct current source, and a second end electrically connected to a device consuming electrical power,
- the electrical power transmitted by the or each tensile reinforcement layer of the submarine cable is higher than 1 KW.
- the inner annular space defined between the electrical insulation arrangement and the internal metallic tube only comprises metals having an electrical conductivity comprised between $2.0\times10^7$ S/m and $4.6\times10^7$ S/m at 20° C.

The present invention also relates to an umbilical comprising at least one submarine cable as defined above, at least a tube configured to transport fluid, and an outer tubular sheath surrounding the submarine cable and the or each tube.

The umbilical according to the invention may comprise the following feature:

- the umbilical has a length higher than 5 km.

The present invention also relates to an installation, comprising

- a surface facility on a surface of a body of water, comprising a source of electrical energy,
- a subsea facility at the bottom of the body of water, comprising at least a device consuming the electrical energy provided by the surface facility, and
- at least an umbilical as defined above, the or each umbilical connecting the surface facility to the subsea facility so as to transmit the electrical energy from the source on the surface facility to the device on the subsea facility through at least one conductive tensile reinforcement strand of the at least one tensile reinforcement layer placed between the electrical insulation arrangement and the internal metallic tube.

The installation according to the invention may comprise the following feature:

- the source of electrical energy is a direct current source and electrical energy is transmitted as a direct current.

The present invention further relates to a method for transmitting electrical energy, comprising the following steps:

providing a surface facility on the surface of a body of water having a source able to provide electrical energy and a subsea facility at the bottom of the body of water having at least a device able to consume electrical energy, providing at least an umbilical as defined above, connecting each umbilical to the surface facility and the subsea facility, each umbilical transmitting electrical energy from the source to the device in the subsea facility through at least one conductive tensile reinforcement strand of the at least one tensile reinforcement layer placed between the electrical insulation arrangement and the internal metallic tube contained in the submarine cable of the at least one umbilical.

The method according to the invention may comprise any or several of the following features, taken individually or according to any technically possible combination:

it comprises transmitting the electrical energy to the subsea facility by electric currents passing through at least a first conductive tensile reinforcement strand among the conductive tensile reinforcement strands and returning of the electrical currents through another conductor or through the water of the body of water, the electrical energy is transmitted by a direct current running through at least one conductive tensile reinforcement strand of the at least one tensile reinforcement layer placed between the electrical insulation arrangement and the internal metallic tube contained in the submarine cable of the at least one umbilical.

BRIEF DESCRIPTION OF THE DRAWINGS

The invention will be better understood by reading the following description, provided only as way of example, and given with reference being made to the enclosed drawings, where.

In the document below, the terms 'outer' or 'external' and 'inner' or 'internal' are generally to be understood radially relative to an axis A-A' of the umbilical, the term 'outer' being understood as being relatively radially further from the axis A-A' and the term 'inner' being understood as being relatively radially closer to the axis A-A' of the umbilical.

DETAILED DESCRIPTION

Figure 1:
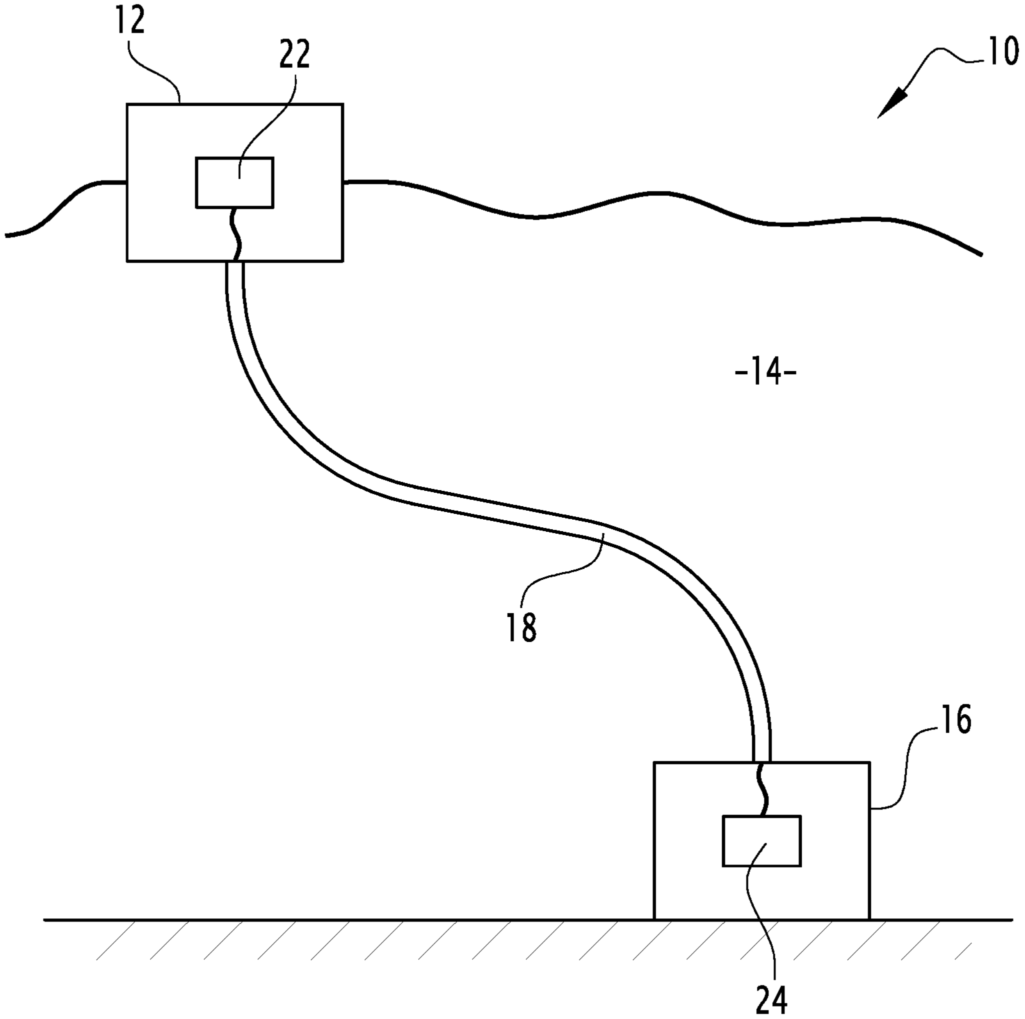
FIG. 1 is a schematic view of an installation for providing electrical energy from the surface facility to the subsea facility according to the invention.

A fluid exploitation installation 10 is represented on FIG. 1. The installation 10 comprises a surface facility 12 on a surface of a body of water 14, a subsea facility 16 at the bottom of the body of water 14, and at least an umbilical 18 connecting the surface facility 12 to the subsea facility 16.

The surface facility 12 is generally floating.

The surface facility 12 comprises at least a source 22 of electrical energy. The source 22 is electrically connected to the umbilical 18.

Preferably, the source 22 provides electrical energy under the form of direct current to reduce the power loss during transmission of electricity. Alternatively or additionally, the source 22 provides electrical energy under the form of alternating current.

The electrical power provided by the source 22 is advantageously greater than 1 kW, preferably greater than 10 kW, more preferably greater than 100 kW. The electrical power provided by the source 22 is advantageously comprised between 50 kW and 1 MW, preferably comprised between 100 kW and 500 kW.

The voltage of the source 22 is generally comprised between 6 kV and 35 kV

For example, according to a typical embodiment of the present invention, the source 22 has a power of 500 kW and a voltage of 20 kV.

The body of water 14 is for example a river, sea, lake, or ocean. The depth of the body of water 14 at the installation 10 is for example comprised between 50 m and 4000 m.

The subsea facility 16 is here located at the bottom of the body of water 14.

The subsea facility 16 is for example a subsea production system (SPS) connected to several wells to collect fluid from the bottom of the body of water 14 and/or inject fluid from the surface of the body of water 14. It comprises several equipment, for example valves, heating systems, manifolds, or christmas-trees.

In a variant, the subsea facility 16 is located away from the bottom of the body of water 14. It is for example a pump or a heating system mounted on a riser pipeline between the sea bed and the sea surface.

The subsea facility 16 comprises at least a device 24 consuming the electrical energy provided by the surface facility 12, for instance an equipment as described above, a pump or a heating system.

The umbilical 18 transmits the electrical energy from the source 22 on the surface facility 12 to the device 24 on the subsea facility 16.

The umbilical 18 also transmits information such as control signals between the surface facility 12 and the subsea facility 16.

Preferably, the umbilical 18 also transmits fluid, such as air, chemicals, or hydraulic fluid, from the surface facility 12 to the subsea facility 16, and/or from the subsea facility 16 to the surface facility 12, as will be explained below.

The umbilical 18 preferably has a length higher than 600 m, advantageously higher than 2000 m, preferably higher than 5000 m.

Figure 2:
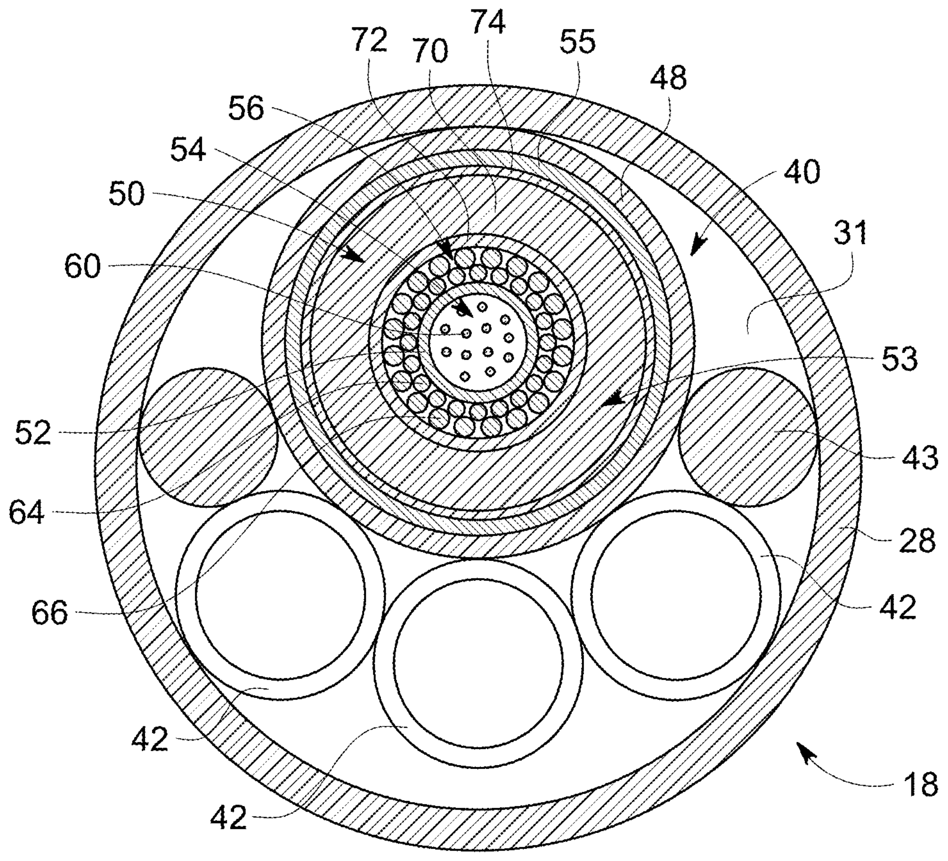
FIG. 2 is a transverse section view of an umbilical according to the invention.

In reference to FIG. 2, the umbilical 18 comprises an outer tubular sheath 28 defining a central space 31 insulated from the outside of the umbilical 18.

The umbilical 18 also comprises at least a submarine cable 40 according to the invention placed in the central space 31.

The umbilical 18 also advantageously comprises at least one tube 42 placed in the central space 31 outside the submarine cable 40.

The umbilical 18 also optionally comprises at least a polymeric filler 43 which is used to fill an interstitial void between other components and obtain the desired configuration.

The outer tubular sheath 28 is configured to protect the umbilical 18. It also includes vent holes to allow free flooding of the umbilical and prevent potential trapped pressure bursting during recovery. It is advantageously made from a polymer material, in particular polyethylene.

The thickness of the outer tubular sheath 28 is for example greater than 3 mm and in particular comprised between 3 mm and 10 mm, preferably comprised between 5 mm and 8 mm.

The submarine cable 40 has a diameter generally greater than 12 mm and in particular comprised between 12 mm and 60 mm, and preferably comprised between 25 mm and 40 mm.

The submarine cable 40 comprises an external tubular sheath 48 defining an inner space 50, and at least an internal metallic tube 52 placed in the inner space 50. It further comprises an electrical insulation arrangement 53 placed in the inner space 50, externally around and apart from the internal metallic tube 52, and an optional metal screen 55 placed between the electrical insulation arrangement 53 and the external tubular sheath 48.

The internal metallic tube 52 defines inwards an innermost space 54, and defines outwards, with the electrical insulation arrangement 53, an inner annular space 56.

The submarine cable 40 also comprises at least one optical fiber 60 placed in the innermost space 54 of the internal metallic tube 52. The submarine cable 40 further comprises at least one tensile reinforcement layer 64, 66 of conductive tensile reinforcement strands 62 placed in the inner annular space 56 between the insulation arrangement 53 and the internal metallic tube 52.

The external sheath 48 insulates the inner space 50 from the outside of the submarine cable 40. The external sheath 48 is for instance made from a polymer material such as polyethylene or cross-linked polyethylene.

The external sheath 48 has a thickness for example greater than 2 mm and in particular comprised between 1 mm and 3 mm.

The internal tube 52 has a diameter advantageously comprised between 2 mm and 5 mm.

The internal tube 52 is made of a metallic material, for instance made of stainless steel such as 316L or 304 grade, aluminium or aluminium coated steel tube.

The internal tube 52 has a thickness lower than 0.5 mm. The relatively low thickness of the internal tube 52 means that the majority of structural strength of the submarine cable 40 is not provided by the internal tube 52.

The optical fibers 60 are configured to transmit information, in particular control signals or monitoring signals through an optical signal between the surface facility 12 and the seabed facility 16.

At least an optical fiber 60 is for example a single-mode fiber comprising a silica core and a polymer coating. It has a transmissivity smaller than 0.22 dB/km at 1550 nm.

Preferably, the or each optical fiber 60 is embedded in a gel, in particular a soft gel inside the internal tube 52. The soft gel is advantageously made of a hydrogen scavenging and water blocking gel. The gel provides flooding protection of the fibers in the event of mechanical failure of the metallic tube.

The conductive tensile reinforcement strands 62 are made of high strength conductors, which can withstand their suspended weight without any armouring in much deeper water depth than copper conductors.

The maximum theoretical water depth Dm (in meters) that can reach a vertically suspended non reinforced conductor can be expressed as (SI units):

$$Dm=Ys/((p-1000)*9.81)$$

where Ys is the conductor tensile yield strength in Pa and p is the conductor density in kg/$m^3$. This formula takes into account the Archimedes buoyant force which reduces the apparent weight of the immerged conductor.

Around this water depth limit Dm, the tensile stress applied to the conductor at the topside point close to the surface reaches the yield strength.

The conductive tensile reinforcement strands 62 according to the present invention are able to reach without any reinforcement a maximum theoretical water depth Dm higher than 4000 m, preferably higher than 6000 m, and more preferably higher than 10000 m. Therefore, the conductive tensile reinforcement strands 62 are able to withstand without armouring their own suspended weight in water depths up to 4000 m, and their load carrying capacity is shared with the other components of the cable 40 to reduce the load in said other components.

Each conductive tensile reinforcement strand 62 preferably has an ultimate tensile strength higher than 250 MPa and in particular comprised between 250 MPa and 350 MPa as measured by the standards ASTM B557 and B557M. This enables the submarine cables 40 to be deployed to deeper parts of the body of water 14.

The density p of the conductive tensile reinforcement strand 62 is preferably smaller than 3500 kg/$m^3$, more preferably smaller than 3000 kg/$m^3$.

In addition, the conductive tensile reinforcement strands 62 have an electrical conductivity higher than 40% IACS (International Annealed Copper Standard).

This allows them to be used as electrical conductors to transmit electrical power from the source 22 to the device 24.

The conductive tensile reinforcement strands 62 however have an electrical conductivity smaller than 75% IACS.

This allows them to keep sufficient mechanical strength to be used as tensile reinforcement. According to a preferred embodiment, the conductive tensile reinforcement strands 62 have an electrical conductivity comprised between 45% IACS and 60% IACS.

Thus, conductive tensile reinforcement strands 62 as referred to herein are electrical conductors having an electrical conductivity higher than 40% IACS and a Dm (calculated according to the formula set forth above) larger than 4000 m.

The conductive tensile reinforcement strands 62 are intended to provide the majority of the structural strength of the submarine cable 40.

Preferably, the ultimate tensile strength of a bundle consisting only of the same number and types of conductive tensile reinforcement strands 62 as in the submarine cable 40 is greater than 50%, in particular greater than 80% of the ultimate tensile strength of the submarine cable 40 as a whole, as measured by the standards ASTM B557 and B557M.

Thus, the conductive tensile reinforcement strands 62 have two main functions, the first one being to withstand the mechanical load applied to the submarine cable 40 by acting as a tensile armour, and the second one being to transmit electrical power by acting as an electrical conductor.

The conductive tensile reinforcement strands 62 comprise aluminium, in particular more than 98% in weight of aluminium. Advantageously, the conductive tensile reinforcement strands 62 comprise 0.5%-0.9% in weight of silica, and 0.6%-0.9% in weight of magnesium. They are for example made of aluminium alloy, in particular 6000 series aluminium alloy.

The 6000 series aluminium alloys are wrought aluminium alloys alloyed with magnesium (Mg) and silicon (Si). They are defined in the European Standard EN 573-1 "Aluminium and aluminium alloys—Chemical composition and form of wrought products-Part 1: Numerical designation system". The four-digits numerical designation system specified in this European Standard is in accordance with the International Alloy Designation System (IADS) developed by the Aluminium Association, Arlington VA 22209, USA. The first of the four digits in the EN 573/IADS designation system indicates the major alloying elements of the aluminium or aluminium alloy.

When it is equal to 1, the corresponding material belongs to the 1000 series and is almost pure wrought aluminium, i.e. comprising 99% or more aluminium. When it is equal to 6, the corresponding material is an aluminium alloy belonging to the 6000 series, and its major alloying elements are magnesium and silicon, which form $Mg_2Si$ precipitate to give improved mechanical properties after heat treatment.

The wrought aluminium alloys belonging to the 6000 series generally have high mechanical properties (e.g. yield strength Ys from 180 MPa to 220 MPa, ultimate tensile strength higher than 250 MPa) and a good electrical conductivity (from 45% IACS to 54% IACS). Their density is lower than 3000 kg/m$^3$, in particular comprised between 2500 kg/m$^3$ and 2900 kg/m$^3$. Their theoretical water depth limit Dm is preferably greater than 10000 m in particular between 11000 m and 13000 m.

Preferably, some or all the 6000 series aluminium strands of the conductive tensile reinforcement strands 62 are made with an aluminium alloy designated 6101 or 6101-A or 6101-B, or 6201 or 6201-A, as defined in the "International Alloy Designations and Chemical Composition Limits for Wrought Aluminium and Wrought Aluminium Alloys" issued by the Aluminium Association, Arlington VA 22209, USA. These materials are those of the 6000 series having the best electrical conductivity.

The 6101, 6101-A and 6101-B grades comprise 0.3%-0.7% in weight Si and 0.35%-0.9% in weight Mg in addition to 0.1%-0.5% in weight Fe, 0.05%-0.1% in weight Cu, and to small amount of Mn, Cr Zn, and B impurities. The 6201 and 6201-A grades comprise 0.5%-0.9% in weight Si and 0.6%-0.9% in weight Mg, in addition to 0.5% in weight Fe, 0.04%-0.1% in weight Cu, and to small amounts of Mn, Cr, Zn and B impurities. The 6201 and 6201-A aluminium alloys offer an appropriate combination between mechanical, electrical and corrosion resistance properties.

In variant, the conductive tensile reinforcement strands 62 comprise aluminium matrix composites such as those disclosed by U.S. Pat. No. 6,180,232. A composite conductor relies on a core of aluminium composite wires surrounded by aluminium-zirconium strands. The composite core comprises metal matrix composite wires, each composite wire containing thousands alumina fibers embedded with aluminium, in particular ultra-high strength micrometer sized alumina (A12 03) fibers embedded within high purity aluminium.

The composite core has an ultimate tensile strength greater than 1000 MPa, in particular comprised between 1300 MPa and 1400 MPa. It preferably has a density smaller than 3500 kg/m$^3$, in particular comprised between 3200 kg/m$^3$ and 3400 kg/m$^3$ and a conductivity smaller than 40% IACS and generally comprised between 20% IACS and 30% IACS.

The aluminium-zirconium strands surrounding the composite core have a smaller ultimate tensile strength than the core, in particular smaller than 200 MPa and generally comprised between 100 MPa and 120 MPa. The aluminium-zirconium strands preferably have a density smaller than 3000 kg/m$^3$, in particular comprised between 2500 kg/m$^3$ and 2900 kg/m$^3$ and a conductivity greater than 50% IACS and generally greater than 60% IACS.

The cross section of the aluminium-zirconium strands surrounding the composite core is much higher than the cross-section of the composite core, typically five times more. Therefore the whole composite conductive tensile reinforcement strand 62 (comprising composite cores and surrounding aluminium-zirconium strands) has an ultimate tensile strength greater than 150 MPa, higher than 200 MPa. It preferably has a density smaller than 3000 kg/m$^3$, in particular comprised between 2700 kg/m$^3$ and 2900 kg/m$^3$ and a conductivity greater than 40% IACS and generally comprised between 50% IACS and 60% IACS. The theoretical water depth limit Dm of such a conductive tensile reinforcement strand 62 is greater than 10000 m, in particular comprised between 11000 m and 11500 m.

In another variant, the conductive tensile reinforcement strands 62 comprise aluminium strands surrounding a composite non-conductive core, as described for example in WO03/091008. This composite core comprises longitudinally oriented and substantially continuous high strength fibers embedded in a thermosetting resin matrix, said fibers being selected from the group consisting of carbon, glass, aramid, boron, liquid crystal fibers, high performance polyethylene and carbon nanofibers. This composite core preferentially has a ultimate tensile strength greater than 1700 MPa (e.g. with carbon fibers) and a density smaller than 2000 kg/m$^3$, in particular comprised between 1500 kg/m$^3$ and 1700 kg/m$^3$ (e.g. with carbon fibers).

The cross-section of the composite core is much smaller than the cross-section of the surrounding aluminium strands, typically ten times less.

Preferably, the inner annular space 56 defined between the internal metallic tube 52 and the electrical insulation arrangement 53 only comprises materials, in particular only comprises metals, having an electrical conductivity comprised between $2{,}0\times10^7$ S/m and $4.6\times10^7$ S/m at 20° C. The electrical conductivity of annealed copper is $5.8\times10^7$ S/m at 20° C., which is equivalent to 100% IACS. A conductivity of $2{,}0\times10^7$ S/m at 20° C. is equivalent to 34,5% IACS. A conductivity of $4{,}6\times10^7$ S/m at 20° C. is equivalent to 79.3% IACS.

In this way, the materials placed in the inner annular space 56 ensure a good electrical conductivity while avoid including copper. In spite of its good electrical conductivity, copper has a high density and a resulting high weight, which are undesirable for submarine cables 40.

Figure 3:
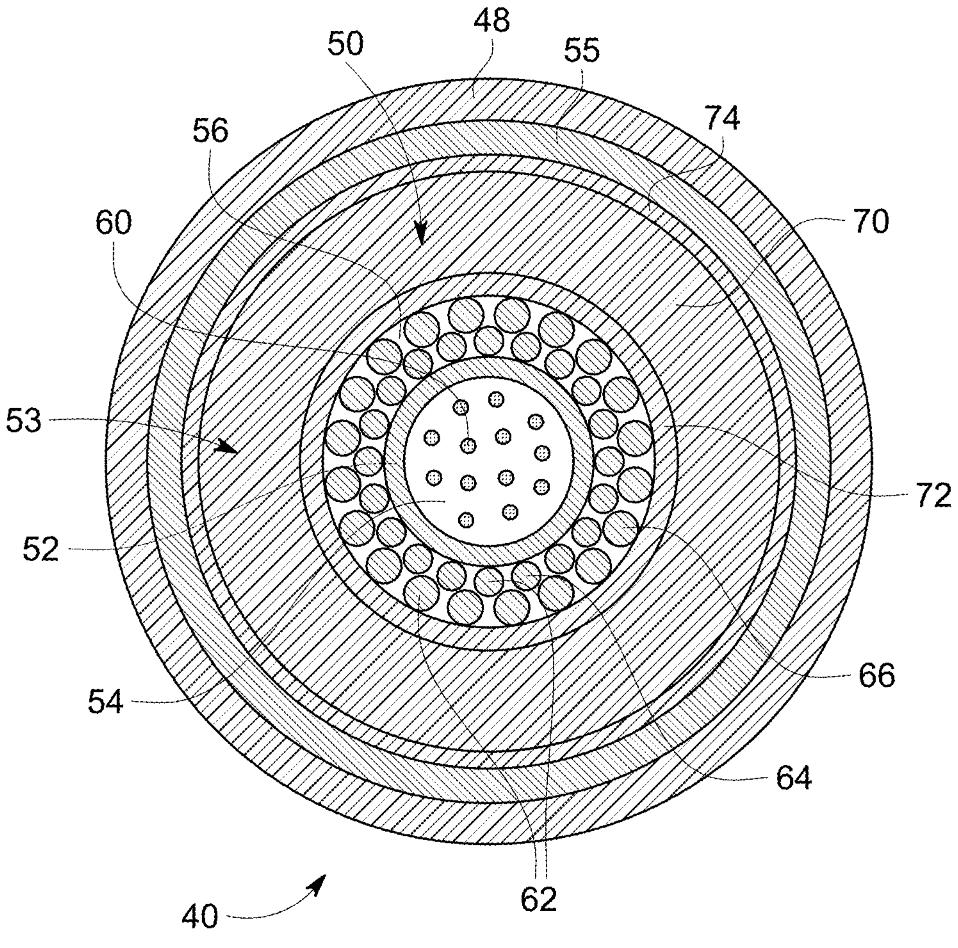
FIG. 3 is a transverse section view of the submarine cable of FIG. 2.
Figure 4:
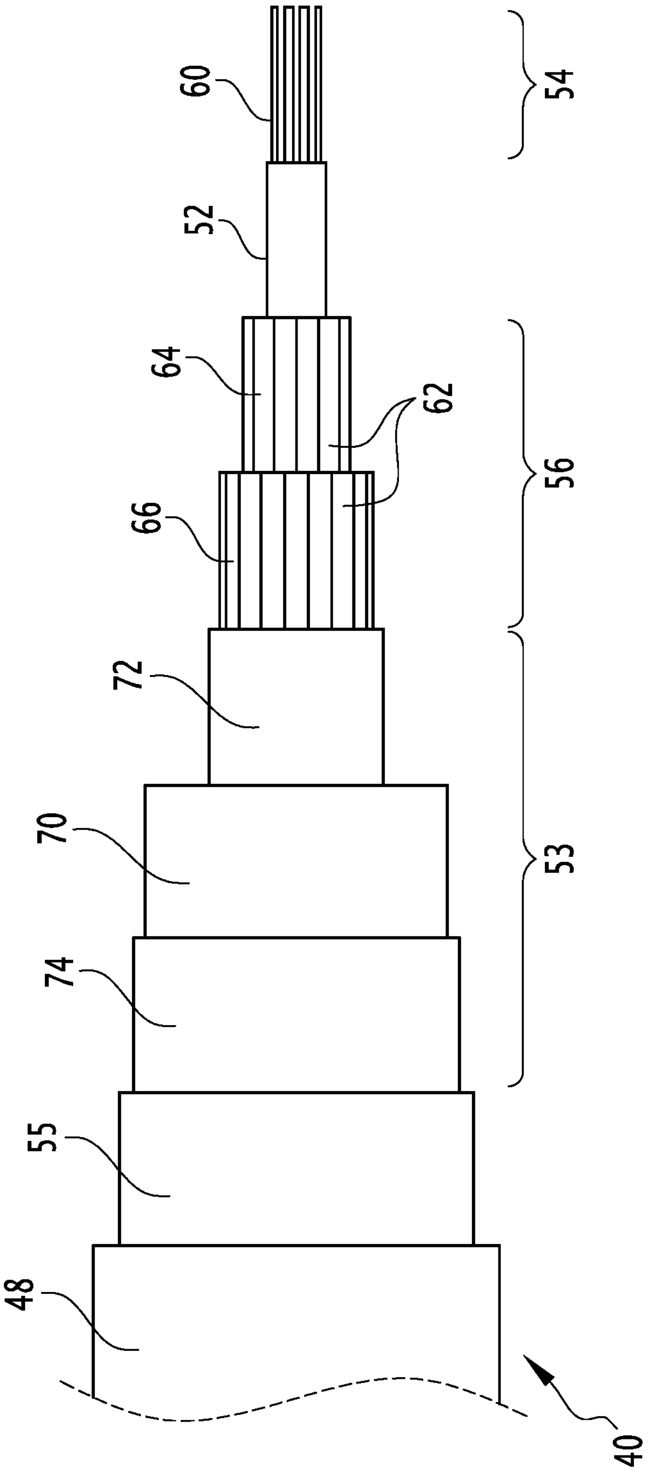
FIG. 4 is a side view showing different layers of the submarine cable of FIG. 2.

According to the embodiment illustrated on FIGS. 2, 3 and 4, the submarine cable 40 comprises at least a pair of tensile reinforcement layers 64, 66 of conductive tensile reinforcement strands 62, applied in a concentric lay or cross-lay, and surrounding the internal tube 52.

Preferably, all conductive tensile reinforcement strands 62 in each layer 64, 66 are parallel to each other, helically with respect to the axis of the submarine cable 40.

Each pair of layers 64, 66 comprises a first tensile reinforcement layer 64, applied on the internal tube 52 or on another pair of tensile reinforcement layers, and a second tensile reinforcement layer 66, positioned around the first tensile reinforcement layer 64.

Each tensile reinforcement layer 64, 66 comprises at least one conductive tensile reinforcement strand 62 helically wound with a long pitch around the internal tube 52. By "wound with a long pitch", it is generally meant that the absolute value of the helix angle is less than 60°, and typically comprised between 15° and 55°.

Preferably, each tensile reinforcement layer 64, 66 is filled with a waterblocking compound (such as a gel) to prevent water ingress in between the conductive tensile reinforcement strands 62, thus avoiding to flood the whole length of the submarine cable in case of mechanical damage of the external sheath 48.

Each conductive tensile reinforcement layer 64, 66 defines a first end electrically connected to the source 22, and a second end electrically connected to the device 24. In this way, the layers 64, 66 of conductive tensile reinforcement strands 62 and the source 22 are able to form part of a current loop with each device 24 on the subsea facility 16.

The electrical power transmitted by the conductive tensile reinforcement strands 62 of the submarine cable 40 is higher than 1 kW, preferably higher than 10 kW, more preferably higher than 50 kW.

The electrical insulation arrangement 53 surrounds the tensile reinforcement layers 64, 66.

This electrical insulation arrangement 53 comprises an inner semi-conductive polymer sheath 72 arranged around the second tensile reinforcement layer 66, an intermediate electrically insulating polymer sheath 70 arranged around the inner semi-conductive polymer sheath 72, and an outer semi-conductive polymer sheath 74 arranged around the intermediate electrically insulating polymer sheath 70.

The inner semi-conductive polymer sheath 72 is preferably extruded around the second tensile reinforcement layer 66. It provides a smooth surface and prevents high electrical stress points from high points of the inner conductor formed by the electrical reinforcement layers 64, 66 thereby preventing deterioration of the insulation over time.

The inner semi-conductive polymer sheath 72 is preferably made of a polymer, doped uniformly with conductive material. Its DC volumetric electrical resistivity is generally much higher than conductive tensile reinforcement strands 62, for example at least 10 times higher, advantageously at least 100 times higher, but much less than the intermediate electrically insulating polymer sheath 70, at least 10 times less, advantageously at least 100 times less.

Therefore, the inner semi-conductive polymer sheath 72 is generally not appropriate to be a conductor, as it cannot withstand a substantial voltage. It is also not appropriate to be an insulator.

Typically, its DC volumetric electrical resistivity is less than 100 ohm.cm at 20° C.

The intermediate electrically insulating polymer sheath 70 is preferably extruded around the inner semi-conductive polymer sheath 72. It is the electrical insulation layer of the submarine cable 40. It is made of cross-linked polyolefin, in particular crosslinked polyethylene. The crosslinked polyethylene is preferably made of a water tree retardant grade to prevent tree growth, which can eventually lead to electrical breakdown when the cable is immersed in water whilst under electrical stress.

As explained above, the DC volumetric electrical resistivity of the electrically insulated polymer sheath 70 is much greater than the semi-conductive polymer sheaths 72, 74. It is generally greater than $10\times10^{15}$ ohm.cm at 20° C.

The outer semi-conductive polymer sheath 74 is extruded around the intermediate electrically insulated polymer sheath 70. It prevents high electrical stress points from protruding points of the outer screen 55 of the submarine cable 40.

The outer semi-conductive polymer sheath 74 is preferably made of a polymer, doped uniformly with conductive material. Its DC volumetric electrical resistivity is generally much higher than conductive tensile reinforcement strands 62, for example at least 10 times higher, advantageously at least 100 times higher, but much less than the intermediate electrically insulating polymer sheath 70, at least 10 times less, advantageously at least 100 times less.

Therefore, the inner semi-conductive polymer sheath 72 is generally not appropriate to be a conductor, as it cannot withstand a substantial voltage. It is also not appropriate to be an insulator.

Typically, its DC volumetric electrical resistivity is less than 100 ohm.cm at 20° C.

The outer screen 55 is an earth or return conductor and also provides electromagnetic shielding. It generally comprises a metallic foil wrapped with overlap and/or braided or lapped metallic wires. The foil and/or the wires are generally made with copper or aluminium.

The thickness of the outer screen 55 is smaller than 2 mm. The outer screen 55 is only a conductor and or electromagnetic shield. Its ultimate tensile strength is smaller than 70 MPa. The electrical conductivity of the outer screen 55 is advantageously greater than $2.9\times10^{7}$ S/m at 20° C.

The outer screen 55 does not have the function of a tensile armour and it is not resistant enough to withstand the mechanical load applied to the submarine cable 40, and especially the tensile loads. Such mechanical load are withstood by the conductive reinforcement layers 64, 66 as explained above.

The at least one tube is configured to transport hydraulic fluids and process chemicals. As an example, the tube 42 carries chemical injection fluid such as corrosion or hydrate inhibitors, emulsifiers or gas aimed at facilitating extraction of oil.

A method of transmitting electrical energy from the surface facility 12 to the subsea facility 16 using an umbilical 18 according to the invention will now be described.

First, a surface facility 12 and a subsea facility 16 are respectively provided on the surface and at the bottom of the body of water 14. At least an umbilical 18 as disclosed above is laid in the body of water 14.

Then, the umbilical 18 is electrically connected to the surface facility 12 and the subsea facility 16, in particular electrically connected to the source 22 on the surface facility 12 and to the device 24 on the subsea facility 16. The conductive tensile reinforcement layers 64, 66 are connected at their upper end to the source 22 and at their lower end to the device 24. A return circuit is established to allow the electrical current to return to the source 22, either through another submarine cable 40 or through the body of water 14.

Afterwards, the source 22 provides electrical power. The electrical power is transmitted through the umbilical 18 by the layers 64, 66 of conductive tensile reinforcement strands 62 until it reaches the device 24 on the subsea facility 16. The device 24 then consumes the electrical energy.

Preferably, during the transmission of electrical energy, the optical fibers 60 transmit optical signals, for example control signals or monitoring data signals collected from sensors on the installation 10 from the surface facility 12 to the subsea facility 16 and/or from the subsea facility 16 to the surface facility 12. Hence, the optical fibers 60 permit communication between the surface facility 12 and subsea facility 16 simultaneously to the transmission of electrical energy in the installation 10.

Preferably, during the transmission of electrical energy, the tube(s) 42 transfer(s) fluid between the surface facility 12 and the subsea facility 16. For instance, one tube 42 provides gas to the subsea facility 16 while another tube 42 collects gas from the subsea facility 16. As another example, one tube 42 provides chemical injection fluid or hydraulic fluid to the subsea facility 16.

Thanks to the invention disclosed above, the weight of the umbilical 18 as well as its diameter are greatly reduced. This facilitates setting up the installation 10 for use. In addition, the structural strength of the umbilical 18 is reinforced, which allows the submarine cable 40 to be deployed in deep waters.

Figure 5:
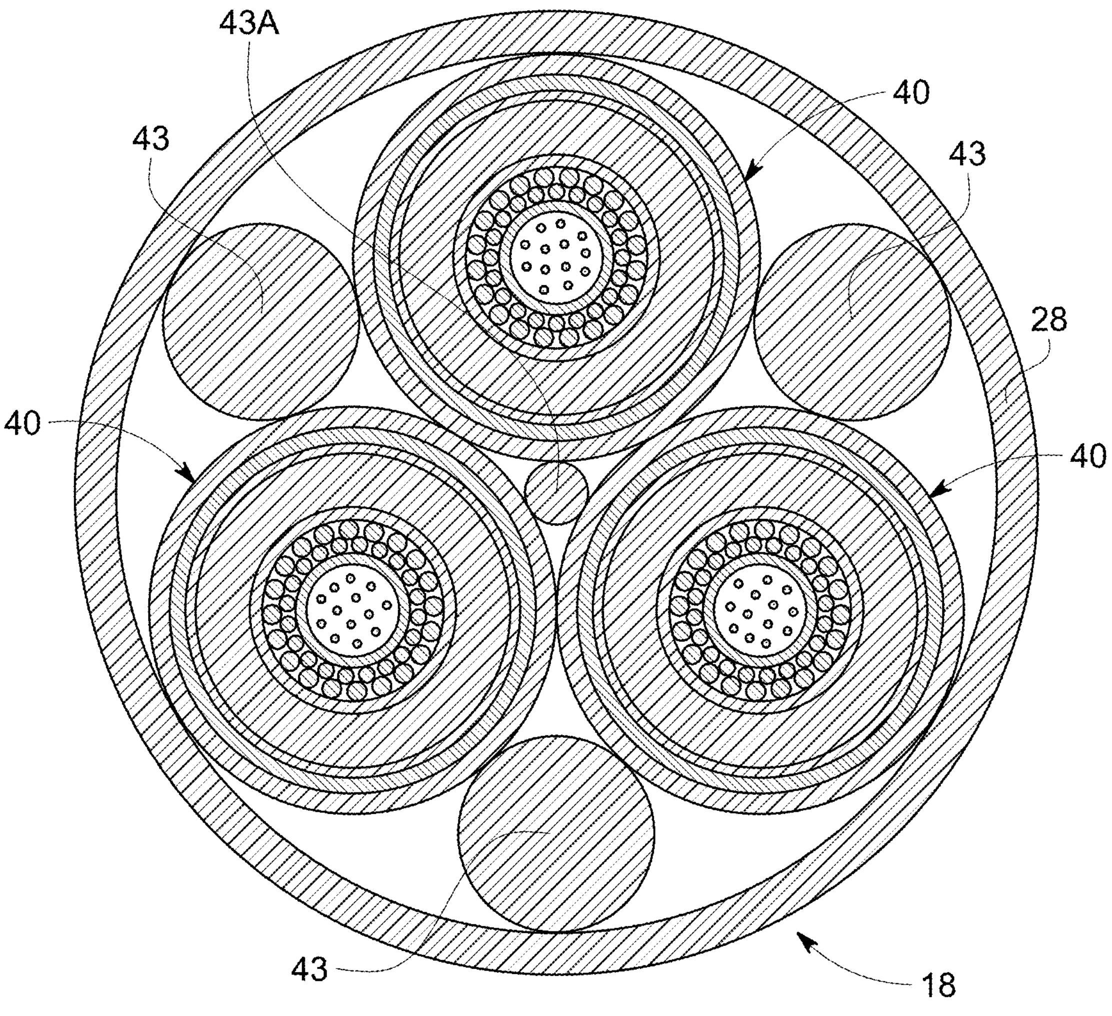
FIG. 5 is a transverse section view of another umbilical according to the invention.

In a variant shown in FIG. 5, the umbilical 18 comprises three submarine cables 40 which are similar to the one shown by the FIG. 2. These three cables 40 are bundled in a symmetrical arrangement and are used as a trefoil bundle for a three-phase AC power transmission. The umbilical 18 of FIG. 5 also comprises several polymeric fillers 43 including a central filler 43A located between the three cables 40 and an outer tubular sheath 28.

The invention claimed is:

1. A submarine cable, comprising:
- an external tubular sheath defining an inner space, the external tubular sheath insulating the inner space from the outside of the submarine cable,
- at least one optical fiber,
- an internal metallic tube placed in the inner space, the at least one optical fiber being placed in the internal tube,
- an electrical insulator placed in the inner space, externally around and apart from the internal metallic tube,
- at least a tensile reinforcement layer formed of conductive tensile reinforcement strands made of aluminum or of aluminum alloy placed between the electrical insulator and the internal metallic tube,
- wherein the at least one tensile reinforcement layer has a first end configured to be electrically connected to a current source, and a second end configured to be electrically connected to an electrical power consumer, the first end and the second end of the tensile reinforcement layer protruding out of the external tubular sheath defining the inner space to be electrically connected to either the power source or to the electrical power consumer, and
- wherein the electrical insulator comprises an inner semi-conductive sheath, an intermediate electrically insulating sheath and an outer semi-conductive sheath.

2. The submarine cable according to claim 1, wherein the conductive tensile reinforcement strands have an electrical conductivity higher than 40% IACS and a maximum theoretical water depth Dm larger than 4000 m.

3. The submarine cable according to claim 1, wherein the conductive tensile reinforcement strands placed between the electrical insulator and the internal metallic tube only comprise metals having an electrical conductivity comprised between $2.0\times10^7$ S/m and $4.6\times10^7$ S/m at 20° C.

4. The submarine according to claim 1, comprising, between the external tubular sheath and the electrical insulator, an electromagnetic shield outer screen.

5. The submarine cable according to claim 1, wherein the electrical power transmitted by the at least one tensile reinforcement layer of the submarine cable is higher than 1 KW.

6. An umbilical, comprising at least one submarine cable according to claim 1, at least a tube configured to transport fluid, and an outer tubular sheath surrounding the submarine cable and the at least one tube.

7. The umbilical according to claim 6, wherein the umbilical has a length higher than 5 km.

8. A method of transmitting electrical energy, comprising the following steps:
- providing a surface facility on the surface of a body of water having a source configured to provide electrical energy and a subsea facility at the bottom of the body of water having at least an electrical power consumer configured to consume electrical energy,
- providing at least one umbilical according to claim 6,
- connecting the at least one umbilical to the surface facility and the subsea facility,
- the at least one umbilical transmitting electrical energy from the source to the at least one electrical power consumer in the subsea facility through at least one conductive tensile reinforcement strand of the at least one tensile reinforcement layer placed between the electrical insulator and the internal metallic tube contained in the submarine cable of the at least one umbilical.

9. The method of transmitting electrical energy according to claim 8, comprising transmitting the electrical energy to the subsea facility by electric currents passing through at least a first conductive tensile reinforcement strand among the at least one conductive tensile reinforcement strand and returning of the electrical currents through another conductor or through the water of the body of water.

10. The method of transmitting electrical energy according to claim 8, wherein the electrical energy is transmitted by a direct current running through the at least one conductive tensile reinforcement strand of the at least one tensile reinforcement layer placed between the electrical insulator and the internal metallic tube contained in the submarine cable of the at least one umbilical.

11. An installation, comprising:
- a surface facility on a surface of a body of water, comprising a source of electrical energy,
- a subsea facility at the bottom of the body of water, comprising at least an electrical power consumer consuming the electrical energy provided by the surface facility, and
- at least one umbilical comprising at least one submarine cable, at least a tube configured to transport fluid, and an outer tubular sheath surrounding the submarine cable and the at least one tube,
- the submarine cable comprising,
- an external tubular sheath defining an inner space, the external tubular sheath insulating the inner space from the outside of the submarine cable,
- at least one optical fiber,
- an internal metallic tube placed in the inner space, the at least one optical fiber being placed in the internal tube,
- an electrical insulator placed in the inner space, externally around and apart from the internal metallic tube, and
- at least a tensile reinforcement layer formed of conductive tensile reinforcement strands made of aluminum or of aluminum alloy placed between the electrical insulator and the internal metallic tube,
- wherein the at least one tensile reinforcement layer has a first end electrically connected to the current source, and a second end electrically connected to the electrical power consumer, and
- the at least one umbilical connecting the surface facility to the subsea facility so as to transmit the electrical energy from the source on the surface facility to the at least one electrical power consumer on the subsea facility through at least one conductive tensile reinforcement strand of the at least one tensile reinforcement layer placed between the electrical insulator and the internal metallic tube.

12. The installation according to claim 11, wherein the source of electrical energy is a direct current source and electrical energy is transmitted as a direct current.

13. A submarine cable, comprising:

an external tubular sheath defining an inner space, the external tubular sheath insulating the inner space from the outside of the submarine cable, at least one optical fiber, an internal metallic tube placed in the inner space, the at least one optical fiber being placed in the internal tube, an electrical insulator placed in the inner space, externally around and apart from the internal metallic tube, at least a tensile reinforcement layer formed of conductive tensile reinforcement strands made of aluminum or of aluminum alloy placed between the electrical insulator and the internal metallic tube, wherein the at least one tensile reinforcement layer has a first end configured to be electrically connected to a current source, and a second end configured to be electrically connected to an electrical power consumer, the internal metallic tube and the electrical insulator defining between them an inner space, the inner space exclusively comprising materials having an electrical conductivity comprised between $2.0\times10^7$ S/m and $4.6\times10^7$ S/m.

* * * * *